Figure 6:
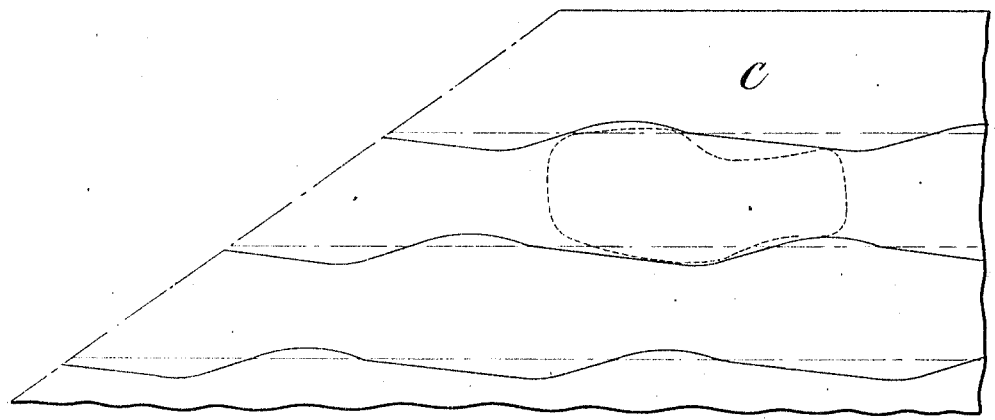

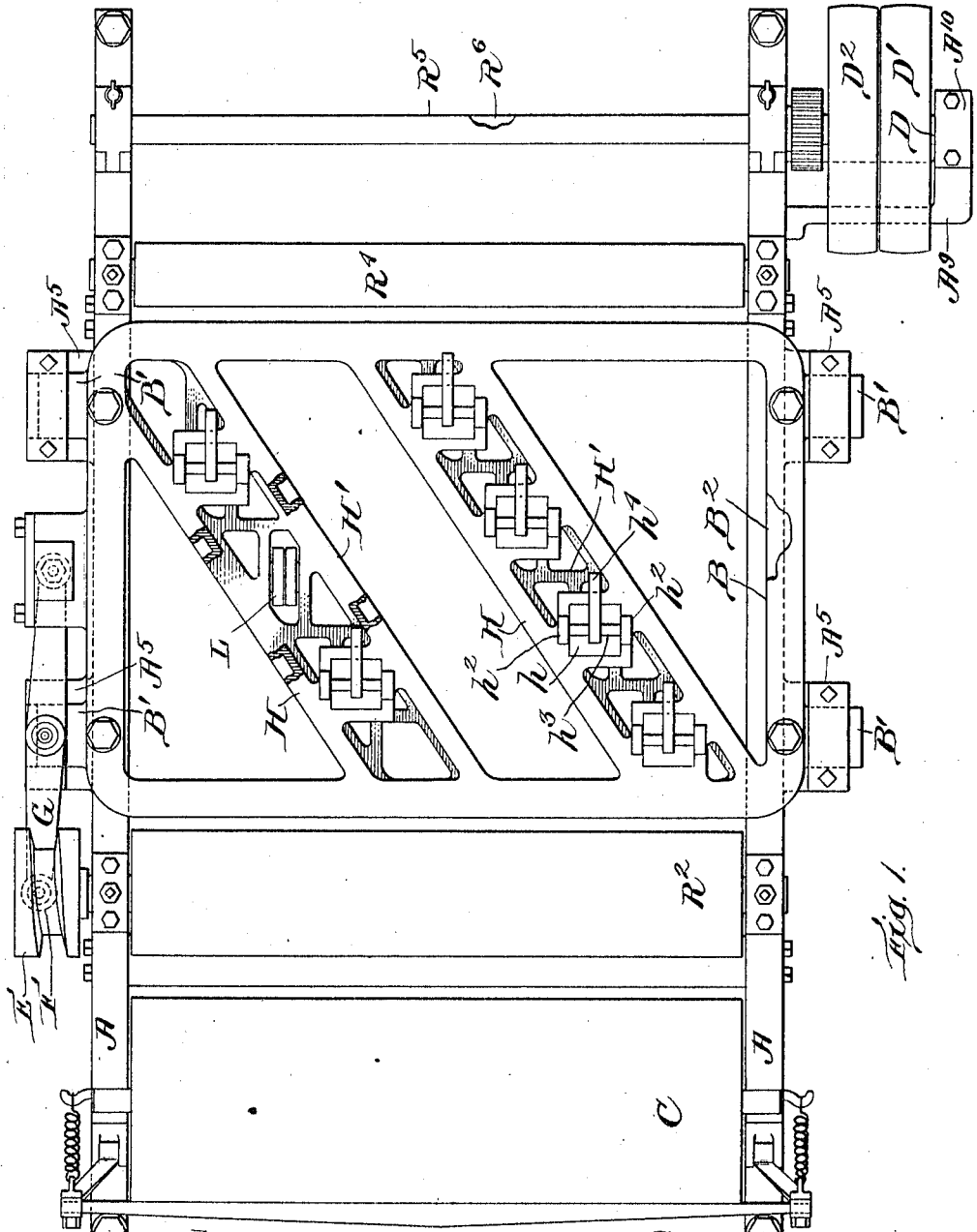

W. B. WESCOTT.
CUTTING MACHINE.
APPLICATION FILED JAN. 2, 1912.
1,021,028.
Patented Mar. 26, 1912.
3 SHEETS—SHEET 2.
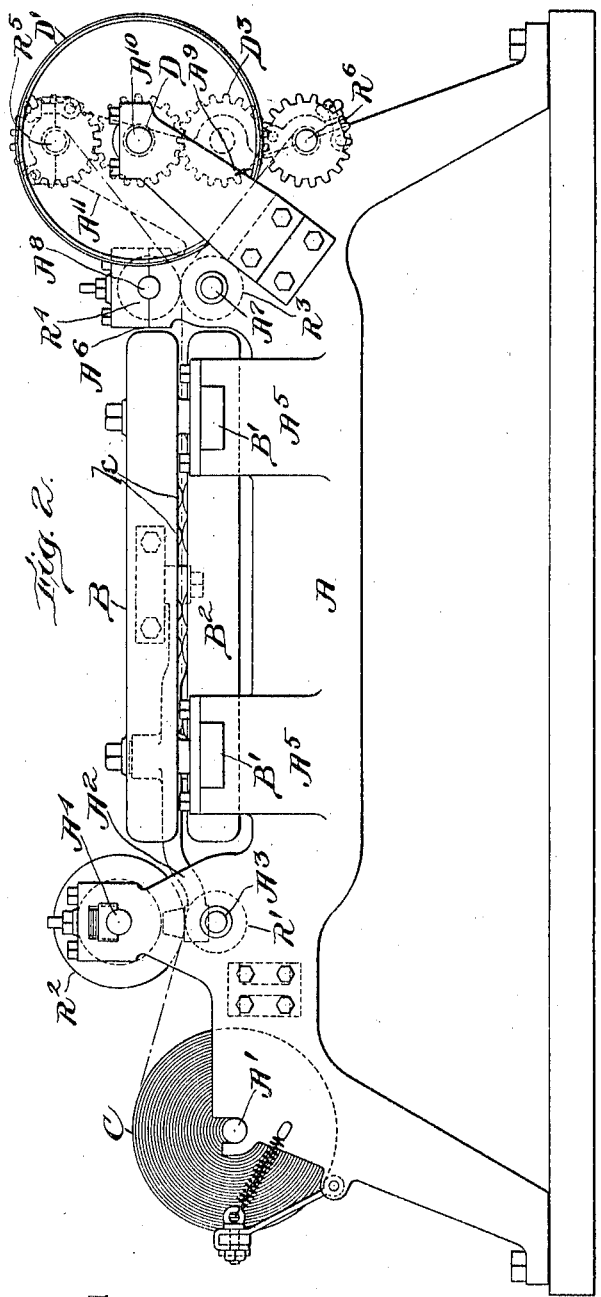
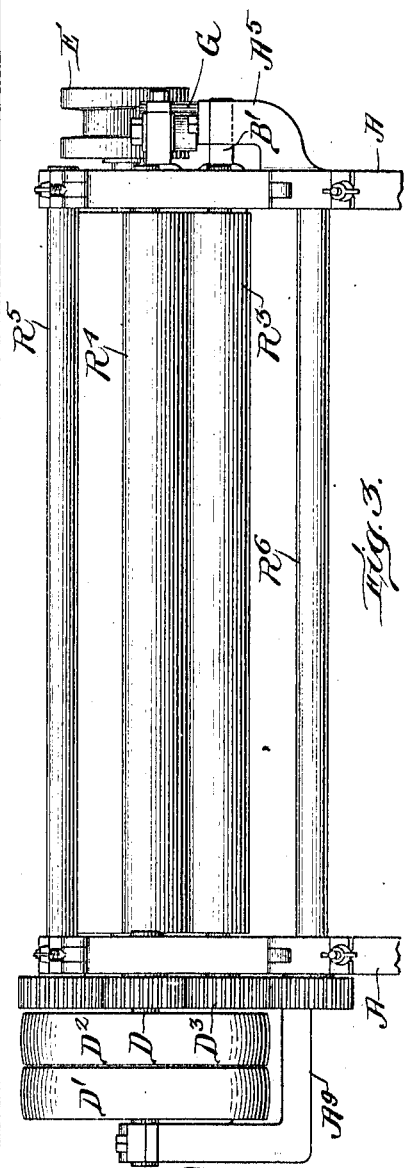

UNITED STATES PATENT OFFICE.

WILLIAM BURTON WESCOTT, OF ROXBURY, MASSACHUSETTS.

CUTTING-MACHINE.

1,021,028.  Specification of Letters Patent.  Patented Mar. 26, 1912.

Application filed January 2, 1912. Serial No. 668,886.

*To all whom it may concern:*

Be it known that I, WILLIAM BURTON WESCOTT, a citizen of the United States, and resident of Roxbury, in the county of Suffolk and State of Massachusetts, have invented new and useful Improvements in Cutting-Machines, of which the following is a specification.

My improvements relate to machines for cutting sheets, as of cloth, into strips which have curved edges, and is particularly designed so to cut a width of cloth for shoe-lining blanks as to produce a minimum of waste.

My improvements are especially addressed to the preparation of strips of the so-called "gem" duck for application to the inner soles of shoes. This material consists of a stout cotton fabric with a film of rubber composition spread upon one side which, when heated, becomes highly adhesive and sticks to the surface of a leather insole laid upon it.

Within certain recognized commercial limits, the sizes and shapes of shoe insoles vary, and all are of such peculiar outline that the provision of a straight edged strip of duck for insole linings, involves considerable waste of material.

I am aware that it has been proposed to apply insoles to an uncut sheet of "gem" duck in transverse rows and then to cut this duck around each insole by means of knives which are guided by the edges of the insoles themselves, but this mode has not proved to be economical of labor and has been found subject also to waste of material due to errors in the operation of the cutting devices guided in the manner above indicated. When the method of applying leather inner soles in longitudinal series to a single strip of duck is employed, the maximum number of strips has been seven, the standard width of a roll of "gem" duck being thirty inches.

When the insoles are applied to the full width sheet in transverse rows they can be so arranged as to afford a saving of ⅛ over the old single strip method but only by placing alternate rows toeing in the same direction. Thus, rows 1, 3, 5, 7, will toe toward the operator, while rows 2, 4, 6, 8 will toe away. When the heel of the "gem" insole is away from the operator it becomes difficult to cut the sticky strip because the point at which it should be cut lies under that portion of the heel which is to remain unlined.

By means of my improvements which are embodied in the machine hereinbelow described, I am enabled to form eight strips from the single width or roll of "gem" duck, each strip having dimensions which supply the requisite cloth inner lining to the widest commercially produced standard insole.

I have found, taking the largest size of standard manufactured insoles and laying them toe to heel, the rights and lefts alternating, and overlapping to a distance corresponding to the unlined heel portions of the soles, and giving each row a lead over the next, measured from toe to toe, eight such rows can be arranged in a thirty inch width, and thus enable a standard roll of "gem" duck to supply eight strips, provided the edges of the said strips are cut in curves which correspond to the arrangement of insoles above suggested. I have found, also, that by giving each row of inner lining blanks the proper lead over the neighboring row, the curved lines determined by the arrangement of insoles over such blanks, may all be precisely similar; that is to say, by severing a roll of "gem" duck longitudinally along curved lines of cut, each curve precisely similar to all the others, and repeating its form in regular cycle, the said curves having a stated lead one over the next, or, each being a certain amount out of phase with the next curve, the standard thirty inch width of "gem" duck so cut will suffice to supply eight strips with curvilinear edges, each strip large enough to afford the requisite amount of cloth for the inner linings of the largest commercial sizes of insoles, provided these soles are laid in order upon such a strip, first right and then left. The net saving in material is thus seen to be one-eighth as compared with heretofore existing practice.

Taking the commercial conditions in respect to styles and sizes as I have found them existing today, I have ascertained that the correct phase lead of one curved cut over the next is produced by arranging the curves so that similar points in each curve lie in a line diagonal to the edge of the duck sheet, the angle between this diagonal and the edge of the sheet being 34°, 40′.

My invention is comprised and embodied in a machine which works according to the following principle: It produces in a sheet to be cut several similar cyclically recurrent curved cuts which are progressively or diagonally out of phase with each other as referred to a line drawn at right angles to the edge of the sheet. Furthermore, my new machine is characterized by the simultaneous production of the requisite number of curved cuts in a sheet; the relation between the cutters and the sheet may be such as to produce the phase difference in the curved cuts in more than one specific way, all of which however will conform to the following general rule or principle: Regarding the edge of the sheet as the line for measurement of abscissæ, and a line drawn transversely to the sheet at right angles to the edge as the line for measurement of ordinates, the cutters will be spaced transversely to the sheet at different ordinate distance and also so spaced or given a lead one over the other that the cutting points at any given instant of time will each be forming such a portion of the cyclically recurrent curved cut that all the cuts when completed will present progressively the predetermined phase difference or lead one over the other. In the preferred form of machine hereinbelow described this spacing of the cutters is accomplished by spacing the cutters themselves at equal distances one in advance of the other measured by abscissæ, so that the cutting points of the series of cutters will lie in a line or lines diagonally across the sheet, equally spaced across the sheet; the predetermined lead angle under the conditions and in the case above described I have found to be 34°, 40′. In this arrangement all the cutters will simultaneously cut the same aspect of the characteristic curve.

Figure 4:
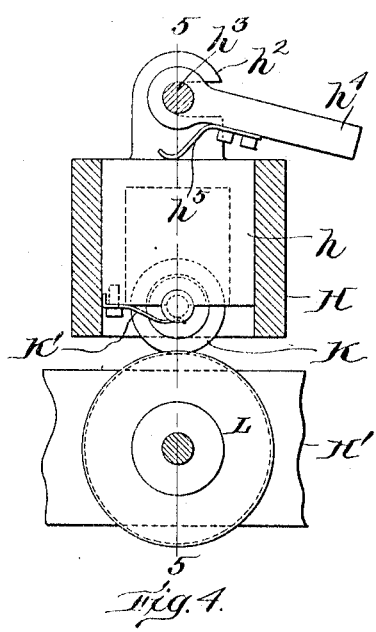
Figure 5:
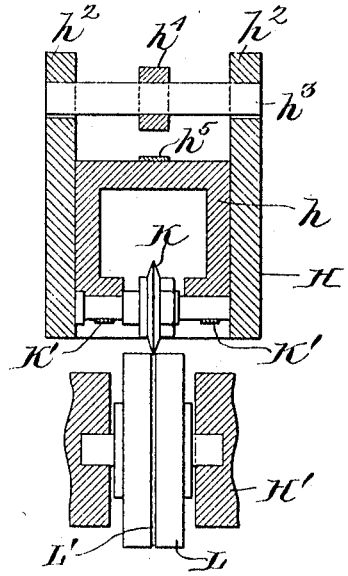

In the drawings hereto annexed which illustrate an example of my invention,—Figure 1 shows a cutting machine in plan view, part being cut away to show other parts lying below; Fig. 2 is a side elevation of the machine; Fig. 3 is an end elevation viewed from the right hand end in Fig. 2; Fig. 4 is a detail on an enlarged scale showing the arrangement of the cutting devices; Fig. 5 is a section taken across Fig. 4 at the line 5—5; and Fig. 6 is a diagram showing the arrangement of similar curvilinear cuts upon a sheet.

Referring to Figs. 1, 2, and 3, A is a suitable frame provided with bearings, A′, for a cloth roll, C, standards, A², with the fixed bearings A³ for a bed roll, R′, and a movable spring pressed bearing A⁴, for the driving roll, R², guides, A⁵, for the frame slides, B′, B′, a cutter frame consisting of an upper member B, and a lower member, B², roll standards, A⁶, providing bearings, A⁷ and A⁸, for the press rolls R³ and R⁴, and brackets, A⁹, on which are the bearings, A¹⁰, for the shaft D which carries the fast and loose pulleys, D′, D², and standards, A¹¹, which provide the bearings for the winding arbors, R⁵, R⁶. The said winding arbors are gear driven from the shaft D, the one directly and the other through an idler gear, D³.

The driving roll, R², is mounted and fixed on the same shaft with the pattern cam, E, which impels the follower, F, and thus through the lever connection, G, imparts a transverse oscillation to the cutter frame, B, B². The cutter frame is provided with two sets of diagonal bridges, H, H′, the former being in the upper member B, of the cutter frame and the latter in the lower member B². The cutting devices are mounted in these diagonal bridges and are thus arranged in echelon with reference to the line of feed of the cloth as it is drawn through the machine. As measured across the sheet to be cut, these cutters are equally spaced apart, and as measured in the direction of the feed of the sheet, they are also equally spaced when one bears in mind that in this sense equal spacing is to be referred to the progressive phase difference between the curvilinear cuts to be produced; thus the provision of two sets of diagonal bridges, H, H′, is adopted for purposes of economy in space. A single bridge extending diagonally across the entire width of the sheet and carrying seven equally spaced cutters, would produce the same effect as the two bridges and the cutters mounted therein according to the spacing indicated in the drawings. In the construction shown, the three cutters of one bridge are simply shifted back from the position they would occupy if they lay in the same diagonal line with the four cutters of the other bridge by a distance equal to that between two successive maxima of the cyclically recurrent curve to be cut in the sheet. The shape of this curve is determined by the shape of the pattern cam, E which is formed in accordance with the system illustrated in Fig. 6 which shows the contour of the curvilinear cut which I have found by experiment to give the results stated hereinabove.

The pattern cam E, is driven by the driving roll, R², and this driving roll derives its movement from the cloth sheet proceeding from the roll C. The sheet is laid through the machine between the bed roll, R′, and the driving roll, R², the upper knives K being lifted for this purpose. In drawing the leading end of the sheet through the cutting frame it may be drawn through by hand in such manner that the cutters begin to perform their office of severing the sheet into eight strips; then alternate strips are led from between the presser rolls, R³, R⁴, to the upper winding arbor R⁵, and the intermediate strips to the winding arbor R⁶, so that the strip members 1, 3, 5 and 7 are, say, wound upon spools (not shown) mounted on the winding arbor $R^5$, or on the arbor itself, while strips 2, 4, 6 and 8 are wound on similar spools secured to the winding arbor, $R^6$, or on the arbor itself. These winding arbors are then set in motion and draw the cloth through the machine imparting movement to the driving roll, $R^2$, which will preferably be provided with a roughened surface or with short needle-like projections (not shown) to insure its rotation without slip. These projections may advantageously be so arranged as to imprint guiding marks on the cloth, to indicate where right and left insoles are to be laid. Rotation of the driving roll, $R^2$, causes rotation of the pattern cam, E, and produces an oscillating transverse movement of the cutter frame over the sheet of cloth forming in the manner above indicated seven similar cyclically recurring curved cuts each having a lead over its neighbor corresponding to the lead afforded by the diagonal arrangement of the cutters.

The cutting devices are illustrated in detail in Figs. 4 and 5. The upper frame has a series of squared passages in each of which slides the block, $h$, in the lower portion of which the disk-knife, K, is journaled, each knife being held in its journal bearing by springs such as $K'$. Ears, $h^2$ are formed on the bridge frame, H, at each side of the squared aperture in which the knife block, $h$, slides. The handle $h^4$, is pivotally mounted as by the short shaft, $h^3$, in the ears, $h^2$, and carries a spring $h^5$, which when the handle, $h^4$, is depressed bears with yielding pressure upon the top of the block, $h$. The lower members of the cutting devices consist of disks, L, grooved at $L'$ and carried on trunnions which turn in suitable bearings in the lower bridge frame, $H'$. The knife disk K, coöperating with the groove, $L'$, shears the sheet as it passes between these two members.

Fig. 6 which represents the arrangement of curvilinear cuts formed in the sheet C, requires no further description in view of the foregoing.

I claim:

1. In a cutting machine, the combination with means to feed a sheet to be cut, of cutting devices spaced transversely across the sheet and comprising means to produce similar cyclically recurrent curved cuts, progressively out of phase with each other, as referred to the line of feed of the sheet.

2. In a cutting machine, the combination with means to feed a sheet to be cut, of cutting devices arranged in echelon across the sheet, and means to move the cutters transversely to the line of feed of the sheet, to produce similar cyclically recurrent curved cuts progressively out of phase with each other as referred to the line of feed of the sheet.

3. In a cutting machine, the combination with means to feed a sheet to be cut, of cutting devices arranged in echelon across the sheet, and means to move the cutters transversely to the line of feed of the sheet, to produce similar cyclically recurrent curved cuts progressively out of phase with each other as referred to the line of feed of the sheet, and winding arbors to receive the strips severed by the said curved cuts, said arbors arranged in such manner that adjacent strips are wound on different arbors.

4. In a cutting machine, the combination with means to feed a sheet to be cut, of cutting devices arranged in echelon across the sheet, and means to move the cutters transversely to the line of feed of the sheet, to produce similar cyclically recurrent curved cuts progressively out of phase with each other as referred to the line of feed of the sheet, and winding arbors to receive alternate strips severed by the said curved cuts.

5. In a cutting machine, the combination with means to feed a sheet to be cut, of a cutter frame, cutters mounted on the cutter frame in echelon across the sheet, a pattern cam, means to drive the pattern cam as the sheet is fed, and connections from the pattern cam to the cutter frame, to move it transversely to the line of feed of the sheet.

6. In a cutting machine, the combination with means to feed a sheet to be cut, of a cutter frame, cutters mounted on the cutter frame in echelon across the sheet, a pattern cam, means to drive the pattern cam from the sheet as the sheet is fed, and connections from the pattern cam to the cutter frame to move it transversely to the line of feed of the sheet.

7. In a cutting machine, the combination with upper and lower winding rolls to draw a sheet, of a cutter frame, cutters mounted on the cutter frame in echelon across the sheet, a pattern cam, a driving roll therefor bearing on and actuated by the sheet, and connections from the pattern cam to the cutter frame to move it transversely to the line of feed of the sheet.

Signed by me at Boston, Massachusetts, this 18th day of December, 1911.

WILLIAM BURTON WESCOTT.

Witnesses:
  ODIN ROBERTS,
  JOSEPHINE H. RYAN.